United States Patent
Mysore et al.

(10) Patent No.: US 7,920,254 B2
(45) Date of Patent: Apr. 5, 2011

(54) SHAFT CONE CROWN MEASUREMENT SYSTEM AND METHODOLOGY

(75) Inventors: Ananda V. Mysore, Sunnyvale, CA (US); Steve G. Gonzalez, Santa Cruz, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 349 days.

(21) Appl. No.: 12/252,232

(22) Filed: Oct. 15, 2008

(65) Prior Publication Data
US 2010/0094588 A1 Apr. 15, 2010

(51) Int. Cl.
G01B 11/26 (2006.01)
(52) U.S. Cl. .......................... 356/138; 356/613
(58) Field of Classification Search .................. 356/138, 356/613; 33/568
See application file for complete search history.

(56) References Cited

U.S. PATENT DOCUMENTS

| | | | |
|---|---|---|---|
| 4,226,539 A | 10/1980 | Nakagawa et al. |
| 4,275,966 A | 6/1981 | Kleesattel |
| 5,349,434 A | 9/1994 | Fleig et al. |
| 5,497,085 A | 3/1996 | Tian et al. |
| 6,091,500 A | 7/2000 | Bahr et al. |
| 6,094,269 A | 7/2000 | Ben-Dove et al. |
| 6,522,395 B1 | 2/2003 | Bamji et al. |
| 6,567,162 B2 | 5/2003 | Koren et al. |
| 6,980,249 B2 | 12/2005 | Albertelli |
| 7,253,889 B2 | 8/2007 | Mysore et al. |
| 7,421,795 B2 | 9/2008 | Mysore et al. |
| 2002/0008139 A1 | 1/2002 | Albertelli |

OTHER PUBLICATIONS

Perry West, "A Roadmap for Building a Machine Vision System," Automated Vision Systems Inc., Los Gatos, CA, published by AIA Machine Vision Online, Ann Arbor, MI. (Available at http://www.machinevisiononline.org/public/articles/AutomatedVisionSystems1.pdf, last visited on Apr. 21, 2009.).

Joe Barrett, "Video Cameras, The Input Device for Machine Vision Applications," Applied Machine Vision '94, Jun. 6-9, 1994, Minneapolis, Minnesota; published by Society of Manufacturing Engineers, Dearborn, MI, 1994, Technical Paper MS94-189.

Daniel Cavasin et al., "Analyzing Measurement Systems: Using Machine Vision for Better Wire Bonds," Advanced Packaging, May/Jun. 1994 Issue, IHS Publishing Group, Libertyville, IL.

(Continued)

Primary Examiner — L. G Lauchman

(57) ABSTRACT

Aspects include metrology methods and systems for determining characteristics of conical shaft portions, such as angle of taper and crown height. In an example, a metrology system includes a fixture for supporting a workpiece. The fixture provides for translation in a longitudinal dimension, and rotation about an axis of symmetry. The system may include a sensor mounted for scanning lines including sections of the workpiece as well as control logic for coordinating translation of the workpiece to provide for an approximately constant ratio of longitudinal translation and lines scanned during scanning operations. The system may include image logic for assembling an image from image data generated during each scanning operation, edge detection logic for detecting an edge shape in each assembled image, and slope and crown height calculation logic for calculating a slope and a crown height of each of the detected edge shapes.

20 Claims, 6 Drawing Sheets

OTHER PUBLICATIONS

Elliot Nestle, "Characteristics and Applications of Non-Contact Sensors for CMM's," Conference: Applying Imaging and Sensor Technology to CMMs, Jun. 10-11, 1993, Nashville, TN; published by Society of Manufacturing Engineers, Dearborn, MI, 1993, Technical Paper IQ93-175.

M.V. Ananda et al., "Residual Error Compensation of a Vision-based Coordinate Measuring Machine," Proceedings of ASPE Annual meeting, Nov. 7-12, 1993, Seattle, WA.

Ronald A. Petrozzo and Stuart W. Singer, "Telecentric lenses simplify noncontact metrology," Schneider Optics Hauppauge, NY—Test & Measurement World, Oct. 15, 2001. (Available at http://www.tmworld.com/article/CA177592.html, last visited on May 14, 2009.).

Shri Krishna Kimothi, "The Uncertainty of Measurements: Physical and Chemical Metrology: Impact and Analysis," 2002, pp. 1-19, 81-105, 270-298 and Index, ASQ Quality Press, Milwaukee, Wisconsin.

SHAFT CONE CROWN MEASUREMENT SYSTEM AND METHODOLOGY

BACKGROUND

1. Field

The current invention is in the field of metrology of objects. Particularly, the invention relates to metrology of characteristics of conical shafts.

2. Related Arts

Magnetic disc drives are used for magnetically storing information. In a magnetic disc drive, a magnetic disc rotates at high speed and a transducing head "flies" over a surface of the disc. This transducing head records information on the disc surface by impressing a magnetic field on the disc. Information is read back using the head by detecting magnetization of the disc surface. The transducing head is moved radially across the surface of the disc so that different data tracks can be read back.

Over the years, storage density of media has tended to increase and the size of storage systems has tended to decrease. This trend has led to a need for greater precision, which has resulted in tighter tolerancing for components used in disc drives. In turn, achieving tighter tolerances in components requires increased precision in metrology systems for characterizing and parameterizing those components.

Air bearing spindle motors may be designed with conical bearing elements. In such instances, the bearing elements consist of conical shafts and corresponding sleeves. The materials used for making these shafts and sleeves include, but are not limited to, steel with highly polished surfaces. The angles of the cones only have a tolerance on the order of ±0.01° and have a crown on the surface with a height of 0.56±0.5 microns over the length of the surface. The crown is the amount of curvature on the outer surface of the cone. It is measured at the point where the distance between the surface of the cone and the imaginary line that represents the surface if there was no crown is greatest.

Existing methods of measuring the crown include using a contact surface profile measurement system. However these systems are slow, on the order of more than 120 seconds per measurement. The systems are also expensive, require a trained operator to properly align and measure the samples. Additionally, the contact method of measuring the samples can potentially damage the sample being measured.

Therefore, what is needed is a low-cost, accurate, and repeatable metrology system that is accurate, fast, and able to measure cone crown height tolerances of 0.56±0.5 microns over an 8 mm length and a repeatability (1-sigma) of 38 nm.

SUMMARY

One aspect of the invention provides a metrology system for measuring the slope and crown height of a workpiece. The metrology system includes a fixture for holding the workpiece, a sensor that obtains line scans of the workpiece, a control system to coordinate the sensor and the fixture so that the line scans can be obtained at approximately equal intervals during scanning, a program for assembling an image from image data generated during the scanning, edge detection software for detecting an edge shape in each assembled image, and calculation software for calculating the slope and the crown height of each of the detected edge shapes.

Another aspect of the invention provides a metrology method for measuring the slope and crown height of a workpiece. The method includes the steps of taking multiple line scans of a workpiece, assembling an image from the line scans, detecting an edge shape in the assembled image, calculating the slope and the crown height of the edge shape, and obtaining both the slope and crown height of the surface of the workpiece based on the calculated slopes and crown heights of the edge shape.

BRIEF DESCRIPTION OF THE DRAWINGS

The invention will now be described in greater detail in the following by way of example only and with reference to the attached drawings, in which.

DETAILED DESCRIPTION

The following description is presented to enable a person of ordinary skill in the art to make and use various aspects of the inventions. Descriptions of specific materials, techniques, and applications are provided only as examples. Various modifications to the examples described herein will be readily apparent to those skilled in the art, and the general principles defined herein may be applied to other examples and applications without departing from the spirit and scope of the inventions. For example, aspects and examples may be employed for characterizing and parameterizing any of a variety of objects. For example, aspects of shaft cone quality may also be characterized. In some cases, shapes other than cones may also be characterized. The exemplary system configurations, components, exemplary tolerances, design criteria, and the like provided herein are for illustrating various aspects and are not intended to limit the configurations, components, tolerances, and/or criteria that may be accounted for in such metrology systems.

Figure 1:
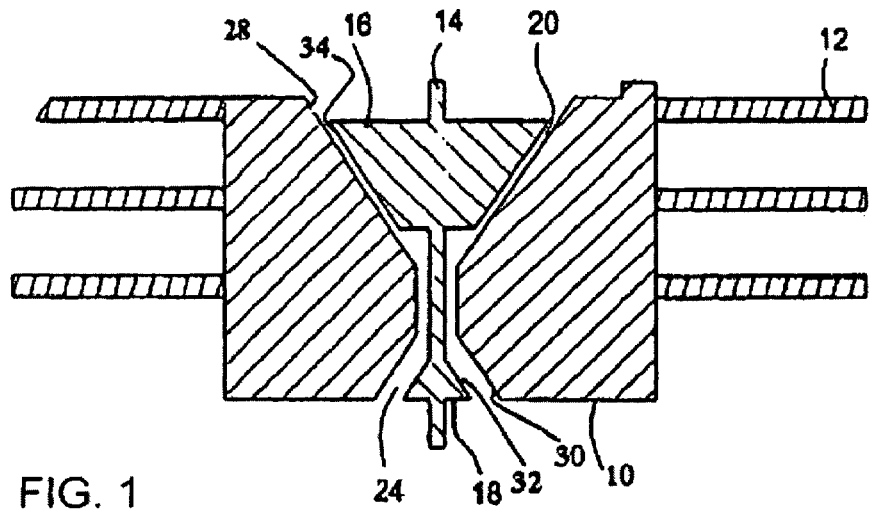
FIG. 1 illustrates a cross-section of a portion of an exemplary disc drive having conical shaft elements.

FIG. 1 illustrates a cross-section of a disc drive motor portion. The portion includes a hub 10 supporting discs 12. In operation, the hub 10 rotates about a fixed shaft 14. The fixed shaft 14 includes an upper shaft bearing cone 16 and a lower shaft bearing cone 18. An outer surface 34 of the upper shaft bearing cone 16 forms an upper hydrodynamic bearing region 20 with opposing upper conical bearing sleeve 28. An outer surface 32 of the lower shaft bearing cone 18 forms a lower hydrodynamic bearing region 24 with opposing lower conical bearing sleeve 30. For proper operation, each of the shaft bearing cones 16 and 18 and respectively opposing conical bearing sleeves 28 and 30 should fit together. An aspect of this fit is the angle at which the shaft bearing cones 16 and 18 taper. To continue rapid and consistent increases in disc drive performance, the taper angle of lower shaft bearing cone 18 and upper shaft bearing cone 16 should be controlled. For example, some potential designs may call for tolerances within at least about 0.01 degrees of the engineered specification. In turn, determining whether shaft bearing cones 16 and 18 are within 0.01 degree of specification requires an accurate metrology device and method.

Figure 2:
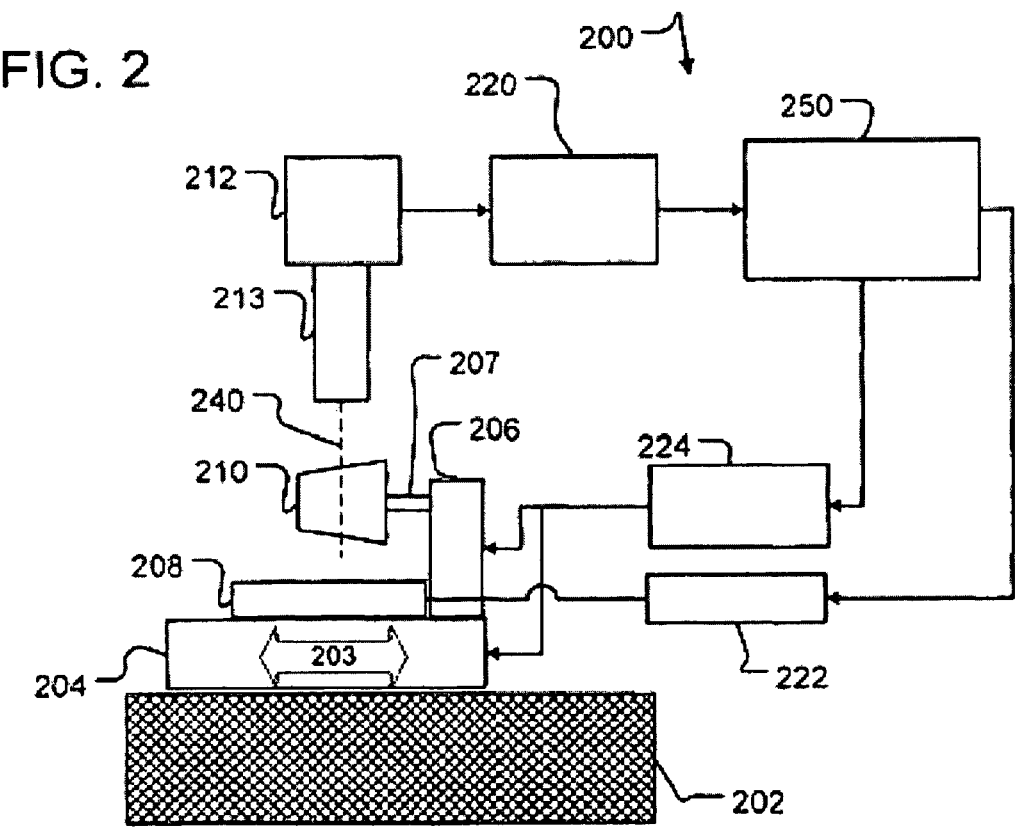
FIG. 2 illustrates an exemplary schematic view of the shaft cone metrology system.

FIG. 2 illustrates a schematic view of an exemplary metrology system 200 for characterizing aspects of conical shaft portions (such as determining cone taper angles and cone crown measurements). The metrology system 200 includes a base 202 that may be formed from granite or another material suitable for providing support and for helping isolate the remainder of the metrology system 200 from vibrations and other undesirable environmental influences. A stage 204 is placed upon the base 202. The stage 204 is moveable in a longitudinal dimension, as indicated by arrows 203. The stage may be designed and secured or otherwise coupled to the base 202 such that during longitudinal movement, the stage 204 remains substantially stationary in other spatial dimensions. A fixture 206 is coupled with the stage 204. The fixture 206 supports a workpiece 210 on a shaft 207 for rotation about an axis of symmetry of the workpiece 210 (exemplary workpiece 210 is conical and therefore has an axis of symmetry parallel with the page in FIG. 2). In the exemplary metrology system 200, the fixture 206 holds the workpiece 210 to maintain the axis of symmetry in a position substantially parallel to the longitudinal dimension (arrows 203) in which the stage 204 moves. The fixture 206 preferably holds the workpiece 210 in place using a vacuum nest.

A camera 212 is mounted such that the stage 204, in moving in the longitudinal direction, moves the workpiece 210 across a field of view of the camera 212. The camera 212 may be a line scan camera for obtaining an image of a single line of pixels each time the camera is operated. An image may be assembled from a plurality of line scans. A line scan camera may be preferable over a camera that obtains an entire image at one time for a variety of reasons. Such reasons may include a lower price per pixel, improved dynamic range of the pixel sensors, a higher pixel fill-factor, and elimination of frame overlaps. A line scan camera may also allow obtaining a higher resolution of a total image.

Camera 212 may be analog or digital, however a digital camera by digitizing image data closer to the sensing source of that data may provide a lower noise image. Camera 212 may be color (i.e., sensitive to and capturing a range of light wavelengths) or camera 212 may be monochrome. A monochrome camera may be preferred for the exemplary metrology system 200 because color cameras may be affected by color aliasing in an image having sharp contrasts between portions of the image. In the present context of a digital camera, camera 212 may generally viewed as a sensor that is controllable to capture image data from a source on command. As such, camera 212 may also operate with an optics system.

In exemplary metrology system 200, telecentric optics system 213 is disposed so that the camera 212 captures image data through the telecentric optics system 213. A telecentric optics system reduces perspective error (parallax) induced by changes in the distance between an object from which reflected light is being sensed (i.e., a photographed object) and the sensor. In the present case, perspective error would be caused by the workpiece 210 being closer to or farther from camera 212, for example during rotation of workpiece 210, as will be further explained herein. Perspective error would cause metrology system 200 to be less accurate because workpiece 210 would be appear to be differently sized in images assembled from scans taken at different points of rotation.

Dashed plane 240 illustrates an approximately perpendicular cross-section (perpendicular to an axis of rotation of workpiece 210) in which camera 212 captures line scans in the present example. Line scans capturing approximately perpendicular cross-sections are convenient. However, line scans having non-perpendicular cross-sections may also be captured, so long as appropriate corrections are made to other algorithms and components of metrology system 200.

Exemplary metrology system 200 may also include high intensity (low exposure) backlighting 208 that emits light for silhouetting workpiece 210 for camera 212. Backlighting 208 may be comprised of light emitting diodes. Backlighting workpiece 210 may provide for sharper definition of the edges of workpiece 210 by helping enhance contrast of workpiece 210 edges against the backlighting. A color (wavelength) of backlighting 208 may be selected based on a sensitivity spectrum of camera 212. A lower wavelength may be preferable for reducing diffraction caused by workpiece 210. Control system 250 may also interface with backlight controller 222. Backlighting 208 may also be strobed in time with the taking of line scans by camera 212 under control of backlight controller 222.

An image acquisition logic 220 interfaces with camera 212 to receive line scan output. Image acquisition logic 220 interfaces with control system 250. Image acquisition logic 220 may assemble an image from the line scans outputted by the camera 212. Image acquisition logic 220 may then provide the assembled image to control system 250 for further image processing, and the like. Image acquisition logic 220 may also provide portions of an image, or as little as a single line scan to control system 250. However, as one of skill in the art would understand, control system 250, if it is to receive line scan image data must be able to respond quickly enough and/or have sufficient buffer space to store line scan image data until that data can be processed.

Timing of when camera 212 captures a line scan should be controlled in present examples of metrology system 200. Image acquisition logic 220 may control this timing either independently, under direction of control system 250, or by some other suitable control means. The control of when camera 212 captures a line scan may also be referred to as shutter control, and a complete cycle of line scan capture may described with reference to a shutter speed. In turn, a frequency of line scan capture may be derived from the timing of the capture, and may be affected by how quickly the sensors of camera 212 can capture enough light to generate an image.

Control system 250 also interfaces with stage and fixture controller 224. Stage and fixture controller 224 controls longitudinal movement of stage 204 and rotation of fixture 206. Longitudinal movement of stage 204 should be coordinated with line scan capture such that a line scan is captured at approximately equal intervals of longitudinal movement, and with a frequency selected to achieve a desired fidelity during image reconstruction. As such, control system 250 should contain logic to coordinate stage and fixture controller 224 with image acquisition logic 220. Thus, metrology system 200 may provide for communication between the image acquisition logic and the stage and fixture controller logic 224 for aiding in this coordination/synchronization. In other examples, control system 250 may communicate with one of image acquisition logic 220 and the stage and fixture controller logic 224, and thereafter synchronization may be accomplished without involvement of control system 250.

In exemplary metrology system 200, the stage and fixture controller 224 causes the stage 204 to move longitudinally through about 8 mm. During that longitudinal movement, the image acquisition logic provides for capture of approximately 8000 lines of image data. Thus, in such an exemplary metrology system 200, a line of image data is captured for approximately each 1 µm of longitudinal movement. A more particular example is provided with regard to FIGS. 4-8, below.

Figure 3:
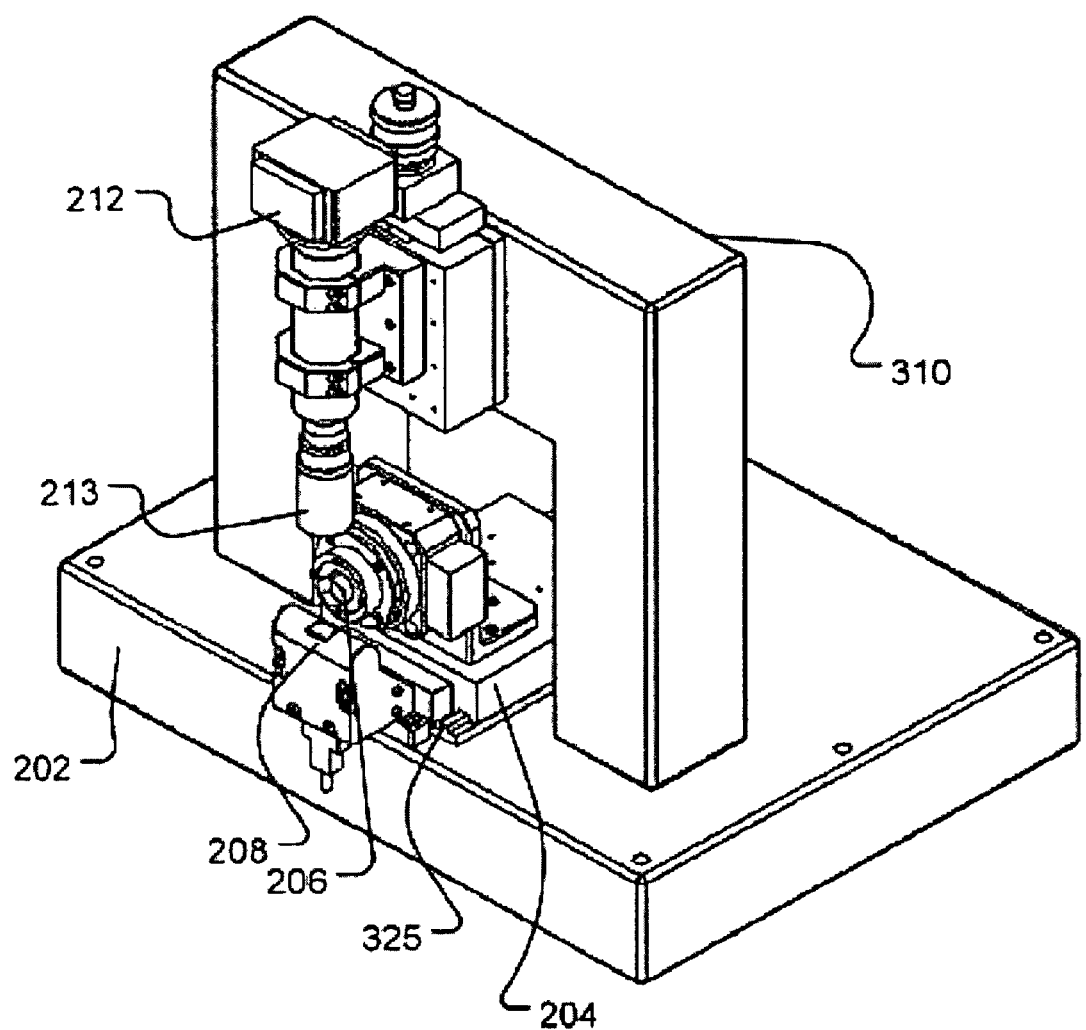
FIG. 3 illustrates a perspective view of an exemplary shaft cone metrology system.

FIG. 3 illustrates a perspective view of an exemplary arrangement of components of the exemplary metrology system 200 of FIG. 2. As discussed above, base 202 provides a stable supporting structure for portions of metrology system 200 described below. In this example, a camera support 310 is secured to base 202 at two locations and may be formed substantially in a U shape, with camera 212 and associated telecentric lens 213 coupled thereto. A convenient aspect of the implementation in FIG. 3 is that stage 204 may be mounted to base 202 between the two locations at which camera support 310 is secured to base 202. In this aspect, stage 204 may move perpendicular to a plane of the U, which allows workpiece 210 to be easily translated under telecentric lens 213 for line scan captures by camera 212. As illustrated, fixture 206 is mounted to stage 204 and provides for an ability to rotate workpiece 210 for obtaining line scans at various different rotation positions. Rotating workpiece 210 may aid in reducing errors caused by imperfections in the workpiece, such as surface blemishes, eccentricities, and roundness errors. Rotating workpiece 210 may also aid in reducing errors from other components of metrology system 210, such as runout of fixture 206.

Stage 204 may be coupled to base 202 through stage guide 325. Stage guide 325 may provide railing portions to aid in guiding stage 204. Stage 204 may be an air bearing stage, as further described below.

In other exemplary metrology systems, instead of, or additionally to, rotation of workpiece 210, camera 212 may be rotated or otherwise moved to obtain line scans from different points with respect to the workpiece 210. Exemplary aspects and examples should not be construed to be limited either implicitly or explicitly to rotating only workpiece 210 for obtaining images of different portions of the conical surface of workpiece 210.

In other examples, a full-frame imaging sensor may be operated in a line scanning mode, or an imaging sensor may be mounted on a movable support for providing line scanning functionality.

Above exemplary systems illustrated and described scanning "longitudinally" which was for example identified by directional arrows 203 in relation to workpiece 210 (FIG. 2). Other examples of relative translation of a workpiece and an image sensor are contemplated. For example, relative translation may be such that line scans may be taken parallel to a direction of rotation of workpiece 210 (as opposed to perpendicularly as in FIGS. 2 and 3). And if line scans are obtained by some other mechanism than scanning with a line scan sensor, for example by sequencing a sensor having multiple lines, then translation examples herein may be adapted accordingly. Thus, the exemplary line scanning functionality and apparatuses should not be considered as a sole way of scanning lines to include cross-sections of an object of metrology.

The above examples included references to, for example, control system 250, stage and fixture controller 224, image acquisition logic 220, and other logical and control functions. These example logical functions and control features may implemented in any of a variety of ways, including by dedicated hardware for each function such as by application specific integrated circuits or programmable custom hardware (e.g., FPGA), by integrating various functions into dedicated hardware, by providing program code implementing one or more described functions in one or more general purpose microprocessors, by dividing some portions of the functions into mechanical control and others into electronic and/or software control. Any combination of the above variations may also be effected.

Figure 4A:
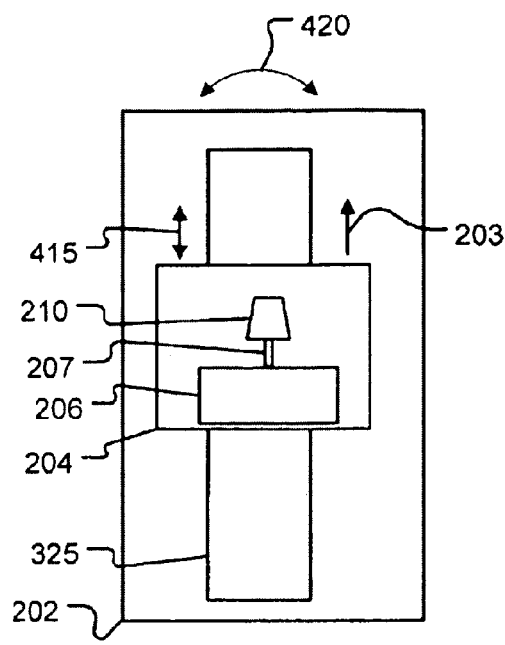
FIGS. 4A-C schematically illustrate an exemplary staging system, and sources of uncertainty arising therefrom.
Figure 4B:
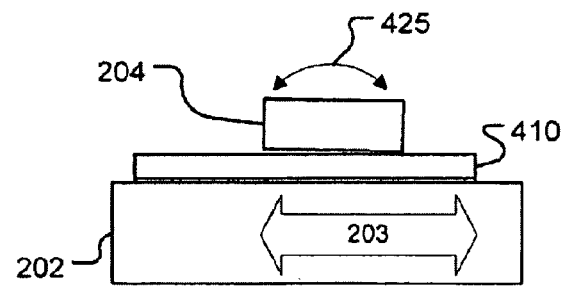
Figure 4C:
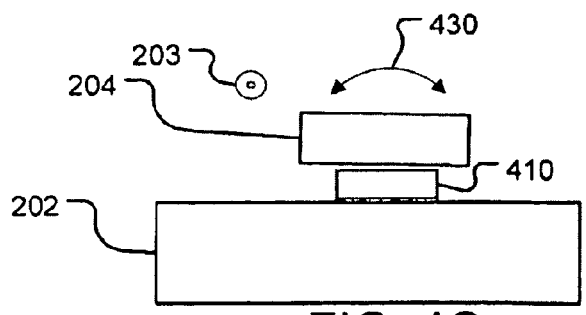

Further exemplary aspects of metrology system 200 are discussed with regard to FIGS. 4A-C. Each of FIGS. 4A-C illustrate a different aspect of error induced by stage 204. FIG. 4A illustrates aspects of yaw and linear error. An ideal stage 204 would linearly translate in one direction (dimension), but would not tilt, lurch, pitch, roll, or otherwise move in any other direction (dimension). However, stage 204 may exhibit a variety of errors in actual usage. One error is linear positioning error represented by double ended arrow 415. As described above, stage 204 translates workpiece 210 under camera 212. In many aspects, this translation should be controlled and repeatable. However, there is some linear error in the stage position, as the stage may either be slightly further along or lagging where it should be at any given time.

Other errors in the stage 204 may include straightness and flatness of movement errors (Δstraightness), each of which are non-rotational movements in directions other than the direction of movement. Straightness error refers to movements not precisely parallel to an intended direction of movement.

Yaw errors ($\epsilon_{yaw}$), illustrated by curved arrow 420 in FIG. 4A are rotational errors about an axis perpendicular to the direction of travel, and not in the horizontal plane of stage 204. FIG. 4B illustrates direction of travel arrows 203, and curved arrow 425 that represents pitch errors ($\epsilon$pitch). Pitch errors are rotational movements about an axis in the horizontal plane of stage 204, but perpendicular to direction of travel arrows 203. FIG. 4C illustrates an end on view of stage 204 (i.e., stage 204 is traveling toward/away from the viewer), and curved arrow 430 which represents roll errors ($\epsilon$roll). Roll errors are rotational errors about an axis parallel to the direction of travel indicated by direction of travel arrows 203.

Other sources of error may include scale error ($\delta$scale) introduced by imprecision in the encoder and motor components of stage 204. All of these errors may be objects of minimization in exemplary aspects. An air bearing stage may be used for aiding in such minimization, with an exemplary air bearing stage being the FiberGlide 1000 from Aerotech.

Effects of the above described errors on accuracy and repeatability of metrology system 200 may be calculated and comprehended in designing metrology system 200. Error in the direction of motion (illustrated as 203 in FIGS. 2 and 4B) and perpendicular to the direction of motion in the horizontal plane of stage 204 can be calculated as demonstrated respectively in equations 1 and 2 below.

$$\Delta y = (\delta_{scale} + \epsilon_{pitch} x \cdot z + \epsilon_{yaw} x \cdot x) \quad \text{Equation 1}$$

$$\Delta x = (\delta_{straightness} + \epsilon_{roll} x \cdot z) \quad \text{Equation 2}$$

A measurement taken with metrology system 200 may have a different sensitivity to some of the above sources of error. For example, $\Delta y$ is directly impacted by the length of the field of view perpendicular to stage motion (x) as this length increases the effect of $\epsilon_{yaw}$. Likewise, both $\Delta y$ and $\Delta x$ are directly sensitive to distance between stage 204 and a point on workpiece 210 being scanned or otherwise imaged, as this distance increases the effect of both $\epsilon_{pitch}$ and $\epsilon_{roll}$.

Figure 5A:
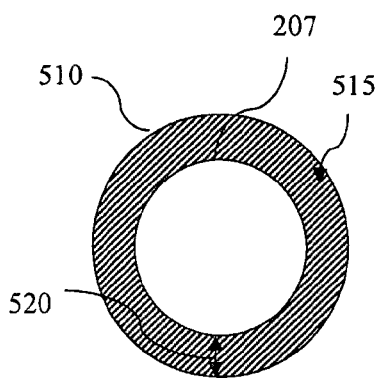
FIGS. 5A-B illustrate an end-on view of an exemplary fixture, and uncertainty arising therefrom.
Figure 5B:
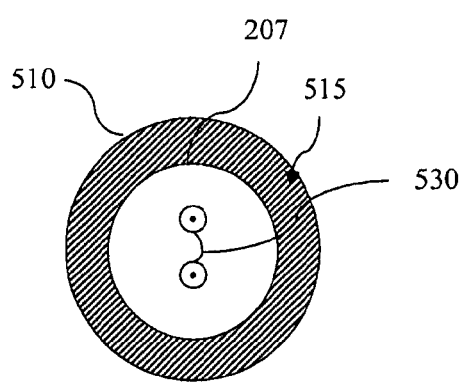

FIGS. 5A-B illustrate that rotation by shaft 207 of fixture 206 may cause inaccuracy in metrology system 200. FIG. 5A illustrates that shaft 207 rotates on bearing system 515 that is disposed between shaft 207 and outer sleeve 510. Because a predominantly circular bearing system is often not strictly circular, bearing systems often have eccentricity which is illustrated by double ended arrow 520 between outer sleeve 510 and shaft 207. This error effect is known as circular runout. Exemplary aspects use telecentric optics system 213 for reducing errors due to this error effect.

FIG. 5B illustrates that another source of inaccuracy may be angular runout 530 (wobble), illustrated as producing arc 530 by a central axis of the workpiece during rotation. The arc is illustrated as two arrows pointing towards the viewer illustrating two different directions in which the rotational axis could point during rotation, if there were a wobble. Smaller wobble would cause arc 530 to be smaller. Angular runout 530 causes workpiece 210 to appear shorter, and hence the cone angle larger. Thus, angular runout 530 should be considered in design of exemplary metrology system 200.

Figure 6:
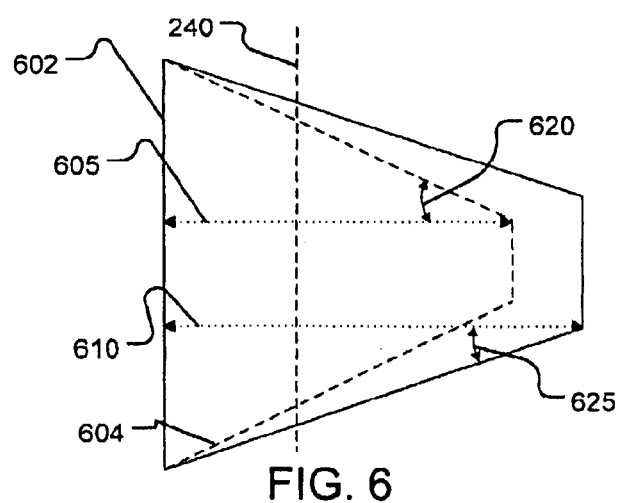
FIG. 6 illustrates aspects of edge detection used in the exemplary shaft cone metrology system.

FIG. 6 schematically illustrates how effects of angular runout 530 can be considered in design of exemplary metrology system 200. Solid cone shape 602 illustrates an outline of workpiece 210 captured at a given angle of rotation of shaft 207. Dashed cone shape 604 illustrates an outline of workpiece 210 at a different angle of rotation of shaft 207. As illustrated, due to angular runout 530, a length 610 of the workpiece 210 for shape 602 appears longer than a length 605 of the workpiece for shape 604. These lengths in turn affect respective apparent cone angles 625 and 620. Thus, error due to angular runout 530 may be calculated as shown below, where a maximum runout is defined by N and L is a nominal length of the workpiece 210.

$$error_{future} = \beta - \alpha = \tan^{-1}\left(\frac{D}{2L}\right) - \tan^{-1}\left(\frac{D}{2M}\right) \quad \text{Equation 3}$$

$$M = L\cos\theta \quad \text{Equation 4}$$

$$\theta = \sin^{-1}(N/L) \quad \text{Equation 5}$$

This result may be probabilistically accounted for by assuming a normal distribution and a 95% confidence level, with a coverage factor of 2, which would provide a standard error of fixture equal to one half of the calculated error.

As described with respect to FIGS. 4A-C, 5A-B, and 6, various errors and inaccuracies in components used to construct exemplary metrology system 200 may be considered so that the system performs as expected and within tolerances. Such components and calculations and errors relating thereto are exemplary, and may be adapted by substitution of differing components as would be understood by one of ordinary skill in the art, including designing systems having other accuracies. As component tolerances improve, it would be expected that tolerances of other components may be relaxed, and that an overall accuracy of a system may improve.

Figure 7A:
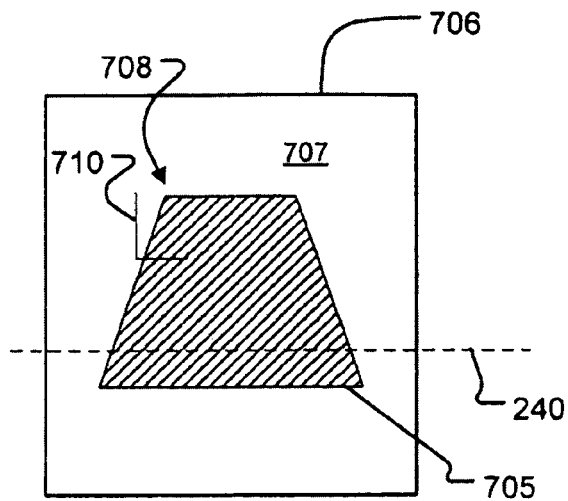
FIGS. 7A-D illustrate exemplary image characterization aspects.
Figure 7C:
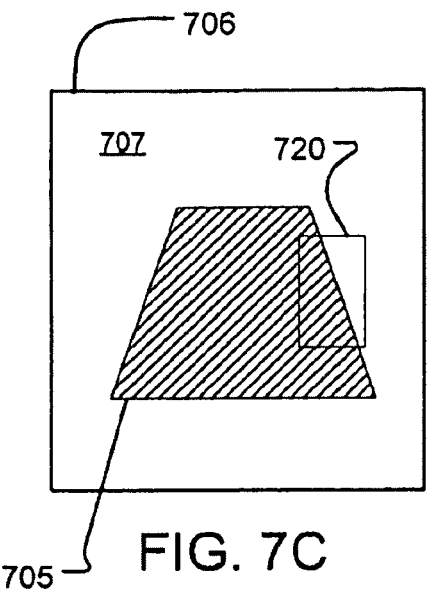
Figure 7B:
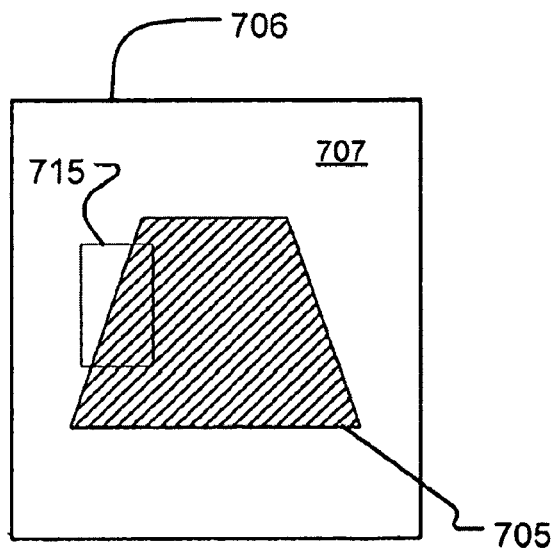

Now turning to FIGS. 7A-C, aspects relating to extracting (detecting) edges of workpiece 210 from captured images are discussed. As used herein extracting may include any operation for producing data describing positional and orientational aspects of such edges. In FIGS. 7A-C, captured image 706 illustrates workpiece image 705 against background 707. In an example, pattern recognition logic may be used for identifying a feature of workpiece image 705 (signifying a feature of workpiece 210) as displayed in captured image 706. For example, pattern recognition logic may identify a corner area 708 of workpiece 210. Such pattern recognition logic may be implemented in control system 250. After identifying the feature of workpiece 210, a coordinate system may be overlayed on the workpiece image 705 with reference to the feature; this coordinate system is illustrated for convenience by site mark 710 in FIG. 7A.

After identifying the feature and setting up the coordinate system, FIGS. 7B and 7C illustrate providing search areas 715 and 720 respectively for the left and right edges of workpiece image 705. Search areas 715, 720 may be located with reference to the coordinate system. By locating the search areas 715, 720 with reference to the coordinate system, the search areas move with the identified feature of the workpiece. For example, in a production metrology situation, workpieces may be loaded on metrology apparatus 200 so that all the workpieces are not in the same physical location during scanning operations. Such a situation would cause various workpiece images 705 (images of different workpieces or rotationally varied images of the same workpiece) to appear in different locations within captured image 706. Because search areas 715, 720 move with reference to the identified feature, the search areas remain within the relevant areas of workpiece image 705 (i.e., remain over edges to be identified). This aspect may increase repeatability by compensating for the exemplary situation described above and other sources of variation during use of metrology system 200.

Figure 7D:

FIG. 7D illustrates a portion of image 705 wherein a crown aspect of a workpiece is emphasized. Dashed line 756 illustrates where a surface of the workpiece would generally occur, if the workpiece were uncrowned. A crowned surface of the workpiece is identified as 755, and as shown here is slightly concave from line 756. A maximal distance between 755 and 756 can be considered a crown height.

Figure 8:
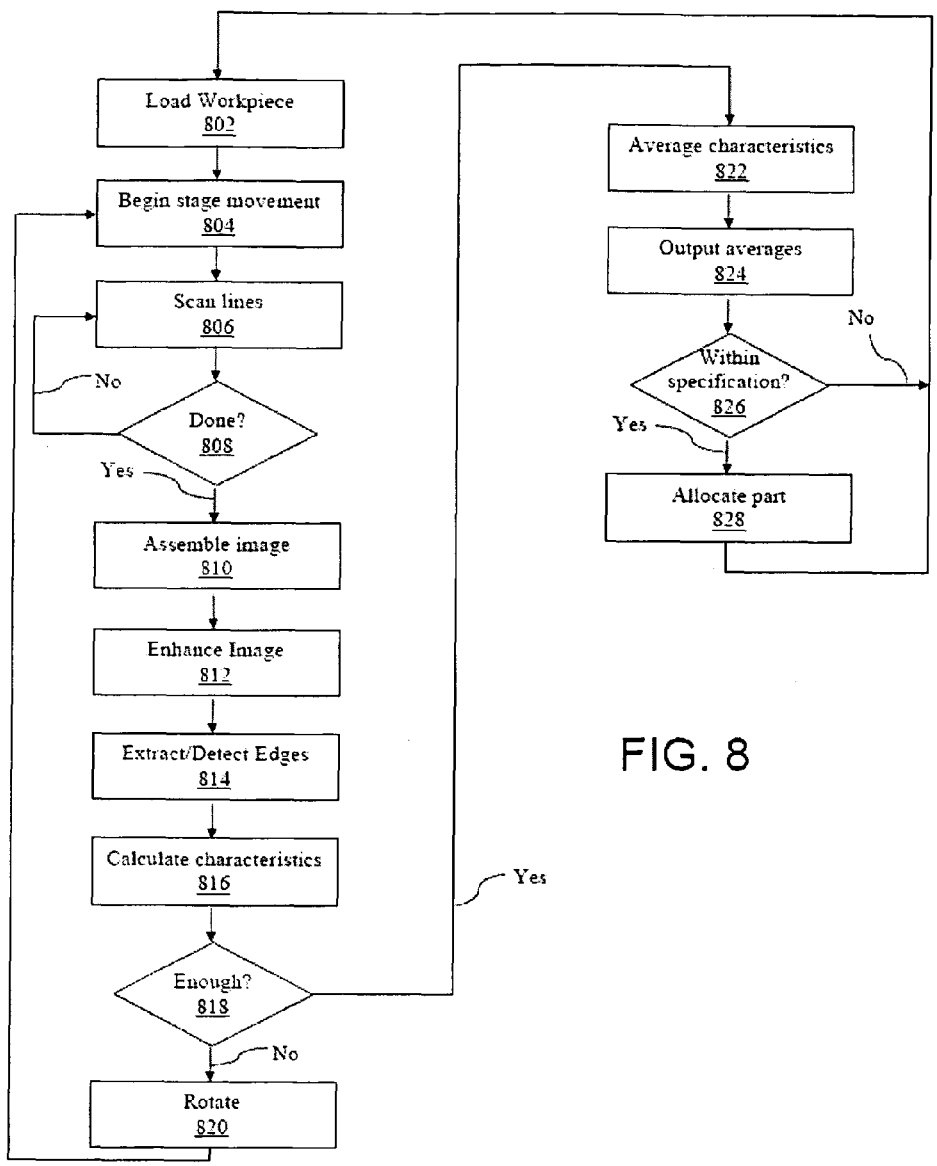
FIG. 8 illustrates exemplary steps of a method for shaft cone metrology.

FIG. 8 illustrates steps of an exemplary metrology method. In 802, a workpiece (e.g., workpiece 210 of FIG. 2) is loaded into the fixture 206, such as via vacuum nesting. In 804, the stage movement is commenced by the stage controller 224 as controlled by control system 250. At 806, the camera 212 captures lines at intervals determined based on a desired resolution, such as the resolution arrived at by the above exemplary calculations for exemplary metrology system 200. 806 may be viewed as an iterative process including a decision block 808 for determining whether a given image scan has been completed (e.g., completed such as to form captured image 706). In practice, any number of different methods and means can be used for determining whether all lines for assembling an image have been captured, such as timers, counters, image feature detecting algorithms, sensors for detecting a position of stage 204, sensing how much memory has been used in a buffer storing image data, and the like.

Following a determination that all the data for assembling an image has been captured, the image is assembled at 810 and may be enhanced at 812. Image enhancement may allow for extraction of better lines in later steps. Image enhancement may include contrast modification, dilation, erosion, and other enhancements known to those of skill in the art of image processing. Following image enhancement, edges may be extracted from the image at 814 (e.g., edges of workpiece image 706 of FIGS. 7A-C). The characteristics (such as slope and crown measurement) of extracted edges may be calculated at 816. In an example, edges extracted from the image are expressed as a series of coordinate points (e.g., a series of pixel data), which may be stored in an array or other data structure.

For determining the slope of the extracted edges, a curve fitting algorithm (e.g., a least square means algorithm) may be used to fit a line to that series of coordinate points. After fitting, the curve may be expressed by an equation that expresses slope of the edge to which the curve was fitted. This slope expresses the angle of taper of the workpiece 210. Other methods for determining a slope of an extracted edge may include calculating a rise over run based on sampled pixel data, and any other method known by those of ordinary skill in the art.

For determining the crown height measurement of the extracted edges, residual higher order terms may be extracted after the determination of the slope of the extracted edges. These residual terms may then be passed through a Median Filter (i.e. a non-linear digital filter) to reduce the noise in the data. The filtered data (Yi) is determined by the equation:

$$Yi=\text{Median}(Ei)i=0,1\ldots n-1 \qquad \text{Equation 6}$$

Where Ei is the subset of the data measured in sequence where Ei $(x_{i-r} \ldots x_{i-1}, x_i, x_{i+1}, \ldots, x_{i+r})$ and where each x represents a data acquisition point.

In an alternate embodiment, the data is fed through a Digitization Noise-Image Averaging Filter. Image averaging is a digital image processing technique that is often employed to enhance video images that have been corrupted by random noise. In order to reduce the algorithm memory requirements, it is possible to compute a Running Average of a continuous image stream by applying the following equation:

$$A(N, x, y)=[I(x, y)+(N-1)\cdot A(N-1, x, y)]/N \qquad \text{Equation 7}$$

Where N is the number of image frames to be computed, A(N, x, y) is the intensity values of pixels located at coordinates (x, y), I(x, y) represents the intensity value of a pixel at the location (x, y) in the image frame, and A(N−1, x, y) represents the average pixel intensity value from the previous N−1 image frames.

Regardless of the filtering method used, a second order polynomial may then be fit to the filtered data. Based on the second order polynomial, the crown height measurement can be computed based on a peak to peak measurement. Once the second order polynomial is determined, an R-squared (Rsq) value for each edge can be calculated to determine the goodness of fit of the second order polynomial to the crown as determined by the filtered data. Rsq can be determined using the following equation:

$$Rsq=1-(SSE/SST) \qquad \text{Equation 8}$$

Where SSE is the sum squares error and SST is the sum squares total. The Rsq values may then be used to accept or reject the crown measurement data.

After calculation of the characteristics of the extracted edges, a determination is made at 818 as to whether more images should be captured such that more edges can be extracted and slopes and/or crown heights obtained therefrom. By averaging a certain number of edge slopes and/or crown heights, better accuracy may be obtainable since workpieces being measured may exhibit local abnormalities and imperfections that induce measurement inaccuracies not easily separable for inaccuracies caused by the metrology apparatus. This determination 818 can include comparing the number of edge slopes and/or crown heights calculated with a predetermined number of edge slopes and/or crown heights, or a number of images with a predetermined number of images, since by analysis it can often be determined how many different scans will be required to obtain a required measurement accuracy, based on expected uniformity of the workpiece. Other determinations can include comparing results obtained between slopes and/or crown heights of edges extracted from different images to detect whether variation appears to be present among the slopes and/or crown heights, or whether all the slopes and/or crown heights are within an acceptable tolerance.

In cases where more images should be extracted, the workpiece may be rotated by rotation of the shaft 207 through some arc. As described above, camera 212 may be rotated instead of or additionally to rotation of workpiece 210. The method then loops back to 804 for beginning stage movement once again. If no more images/edge slopes are required then those characteristics calculated are averaged or otherwise combined at 822, and the averaged characteristics are outputted at 824. Those outputted characteristics are compared with a specification at 826, and if all of the characteristics are within the specification, then the workpiece is allocated for use in a disc drive motor or some other suitable mechanism at 828. And if the workpiece is not within the specification, then the workpiece may be discarded and another workpiece loaded by returning to 802, or the workpiece may be subjected to another metrology run.

Such aspects as described above are merely exemplary, and can be modified, extended, and/or redacted as required for a particular application. For example, a number of images can be captured before edges are extracted from images and characteristics calculated. Slopes and/or crown heights can be averaged or combined in any number of ways. In some aspects, the extracted edges themselves may be averaged (e.g., by averaging pixel or coordinate level data) and a slope and/or crown height extracted from the average of the edges. In other examples, various edge averages may be created, a slope and/or crown height extracted for each created edge average, and slopes and/or crown heights extracted from those edge averages.

This description is exemplary and it will be apparent to those of ordinary skill in the art that numerous modifications and variations are possible. For example, various exemplary methods and systems described herein may be used alone or in combination with various additional metrology systems and other systems for determining suitability of a workpiece under a given specification. Additionally, particular examples have been discussed and how these examples are thought to address certain disadvantages in related art. This discussion is not meant, however, to restrict the various examples to methods and/or systems that actually address or solve the disadvantages.

We claim:

1. A metrology system, comprising:
   a fixture for supporting a workpiece;
   a sensor operable for obtaining line scans which include sections of the workpiece;
   control logic for coordinating the sensor and the fixture to cause line scans comprising image data to be obtained at approximately equal intervals during scanning operations;
   image logic for assembling an image from the image data generated during each scanning operation;
   edge detection logic for detecting at least one edge shape in each assembled image; and
   calculation logic for calculating a slope and a crown height of the at least one detected edge shape.

2. The metrology system of claim 1, wherein the fixture supports the workpiece for relative translation with respect to at least one of the sensor and a fixed position of the sensor.

3. The metrology system of claim 1, wherein the fixture and the sensor are relatively disposed to provide for capture of rotationally varied views of the workpiece.

4. The metrology system of claim 1, wherein the control logic further provides for rotation of the workpiece after a completion of each scanning operation and before a commencement of each subsequent scanning operation, thereby resulting in at least two images of each edge shape.

5. The metrology system of claim 4, wherein the workpiece is a male conical portion, the edges are representative of a slope of the male conical portion, the calculated crown heights for respective edges are related to the crown height of the conical portion, and the calculation logic provides for averaging of the calculated crown heights.

6. The metrology system of claim 1, wherein the sensor includes a line scan camera portion operable to capture line scans through a telecentric lens.

7. The metrology system of claim 1, wherein at least two edge shapes are detected in each assembled image and the calculated crown height of the at least two edge shapes is averaged.

8. The metrology system of claim 1, wherein the edge detection logic is provided with an identified subregion of each assembled image for each of the at least one edge shape and crown height to be detected in that assembled image, each identified subregion associated with a coordinate system associated with an imaged feature of the workpiece detected in that assembled image.

9. The metrology system of claim 1, further comprising:
a LED backlight for silhouetting the workpiece; and
a light intensity controller for controlling the LED backlight.

10. The metrology system of claim 1, wherein the fixture includes a vacuum nest.

11. The metrology system of claim 1, wherein the calculation logic uses a data filter and a second order polynomial to determine the crown height.

12. The metrology system of claim 1, wherein an R-squared value is calculated to determine a goodness of fit of the second order polynomial.

13. A metrology method, comprising:
taking a plurality of line scans of a workpiece;
assembling an image from the plurality of line scans;
detecting at least one edge shape in the assembled image;
calculating a slope and a crown height of the at least one edge shape;
obtaining a slope of a surface of the workpiece based on the calculated slopes of the at least one edge shape; and
obtaining a crown height of a surface of the workpiece based on the calculated crown height of the at least one edge shape.

14. The metrology method of claim 13, further comprising translating the workpiece with respect to a sensor taking the plurality of line scans, the translation providing for approximately equal intervals or as commanded by the encoder between each of the plurality of line scans.

15. The metrology method of claim 14, further comprising:
repeatedly rotating the workpiece through portions of a complete revolution, and, after each rotation, repeating the steps of translating, taking a plurality of line scans, assembling an image, detecting at least one edge shape, and calculating a slope;
obtaining the slope of the surface of the workpiece by averaging the calculated slopes; and
obtaining the crown height of the surface of the workpiece by averaging the calculated crown heights.

16. The metrology method of claim 13, further comprising selecting a search region in which the at least one edge shape is to be detected, the search region associated with a coordinate system mapped to an imaged feature identified in the assembled image.

17. The metrology method of claim 13, further comprising determining if the slope and the crown height of the surface are within a specification and if so then allocating the workpiece for assembly into a disc drive motor.

18. The metrology method of claim 13, further comprising filtering the data and fitting a second order polynomial to the filtered data to determine the crown height.

19. The metrology method of claim 18, further comprising calculating an R-squared value and determining the goodness of fit of the second order polynomial.

20. A metrology system, comprising:
a stage translatable in one dimension while remaining substantially constant in two other dimensions;
a fixture coupled with the stage, the fixture for holding and providing for controllable rotation of a workpiece;
a sensor arranged for capturing line scans of the workpiece through a telecentric lens;
a backlight for silhouetting the workpiece for the sensor;
logic for maintaining an approximately constant ratio between longitudinal translation of the stage and timing of line scan captures;
an image assembler for receiving line scan captures and assembling an image therefrom;
logic for detecting one or more edge shapes in the assembled image; and
logic for determining an angle and a crown height of a surface of the workpiece from the one or more edge shapes.

* * * * *